United States Patent
Kogan (10) Patent No.: US 11,505,312 B2
(45) Date of Patent: Nov. 22, 2022

(54) MAIN ROTOR DAMPER ELASTOMERIC ROD END

(71) Applicant: LOCKHEED MARTIN CORPORATION, Bethesda, MD (US)

(72) Inventor: Anatoly Kogan, New Rochelle, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 733 days.

(21) Appl. No.: 16/390,455

(22) Filed: Apr. 22, 2019

(65) Prior Publication Data
US 2020/0331597 A1 Oct. 22, 2020

(51) Int. Cl.
*B64C 27/00* (2006.01)
*F16F 13/04* (2006.01)
*B64C 27/04* (2006.01)

(52) U.S. Cl.
CPC ............ *B64C 27/001* (2013.01); *B64C 27/04* (2013.01); *F16F 13/04* (2013.01); *B64C 2027/003* (2013.01); *F16F 2232/02* (2013.01)

(58) Field of Classification Search
CPC . B64C 27/001; B64C 27/51; B64C 2027/003; F16F 1/38; F16F 1/3863; B60G 2204/41; B60G 2204/125
See application file for complete search history.

(56) References Cited

U.S. PATENT DOCUMENTS

| | | | |
|---|---|---|---|
| 3,212,584 A * | 10/1965 | Young | B64C 27/51 |
| | | | 416/106 |
| 4,232,563 A | 11/1980 | Peterson et al. | |
| 5,188,513 A | 2/1993 | Byrnes | |
| 6,848,886 B2 | 2/2005 | Schmaling et al. | |
| 7,097,169 B2 | 8/2006 | Mueller | |
| 7,686,584 B2 | 3/2010 | Schmaling | |
| 7,896,747 B2 | 3/2011 | Russell | |
| 8,167,561 B2 | 5/2012 | Jones | |
| 8,632,062 B2 | 1/2014 | James | |
| 10,173,770 B2 | 1/2019 | Nussenblatt et al. | |
| 2014/0015177 A1* | 1/2014 | Yoneyama | B29C 45/14344 |
| | | | 267/141.1 |
| 2014/0217659 A1* | 8/2014 | Barnes | F16F 13/26 |
| | | | 267/140.13 |
| 2016/0053848 A1* | 2/2016 | Nakamura | F16F 1/3863 |
| | | | 248/634 |

* cited by examiner

*Primary Examiner* — Timothy D Collins
*Assistant Examiner* — Justin Michael Heston
(74) *Attorney, Agent, or Firm* — Foley & Lardner LLP (57) ABSTRACT

A damper assembly includes a housing defining at least one or more cavities. A piston is in operable communication with the housing. A rod end is operatively coupled to the piston, the rod end having at least two cartridges.

20 Claims, 8 Drawing Sheets

MAIN ROTOR DAMPER ELASTOMERIC ROD END

STATEMENT REGARDING FEDERALLY SPONSORED RESEARCH OR DEVELOPMENT

This disclosure was made with Government support under N00019-06-C-0081 awarded by the Naval Air Systems Command. The Government has certain rights in this disclosure.

BACKGROUND

Exemplary embodiments relate to the art of rotary wing aircraft, and more particularly, to main rotor damper elastomeric rod ends.

Main rotor blade damper rod ends are used on helicopters to connect the moving blade relative to the main rotor hub. Main rotor damper elastomeric rod ends have undesirable stiffness about the damper axes, causing spiral motion inside the damper, and resulting in additional wear out of the damper internal barrel and piston components.

BRIEF DESCRIPTION

According to one or more embodiments, a damper assembly includes a housing defining at least one or more cavities, and a piston in operable communication with the housing. A rod end is operatively coupled to the piston, the rod end comprising at least two elastomeric core cartridges separated by a void.

In addition to one or more of the features described above or below, or as an alternative, further embodiments could include wherein the rod end comprises a rod end housing, the at least two cartridges opposing one another in the rod end housing.

In addition to one or more of the features described above or below, or as an alternative, further embodiments could include another rod end operatively coupled to the housing, the another rod end comprising another at least two elastomeric core cartridges.

In addition to one or more of the features described above or below, or as an alternative, further embodiments could include wherein each of the at least two cartridges and the another at least two cartridges comprises elastomeric material.

In addition to one or more of the features described above or below, or as an alternative, further embodiments could include wherein each of the at least two cartridges and the another at least two cartridges comprises a tapered shape in a first plane, while maintaining a substantially uniform thickness in a second plane.

In addition to one or more of the features described above or below, or as an alternative, further embodiments could include wherein the first plane is substantially parallel to an axis of linear movement for the piston.

In addition to one or more of the features described above or below, or as an alternative, further embodiments could include wherein a bushing separates the at least two cartridges within a rod end housing, such that a tapered end of the at least two cartridges is adjacent to the bushing and an opposite end of the at least two cartridges is adjacent to the rod end housing.

In addition to one or more of the features described above or below, or as an alternative, further embodiments could include another rod end operatively coupled to the housing, the another rod end comprising another at least two cartridges. A bushing separates the another at least two cartridges within a rod end housing, such that a tapered end of the another at least two cartridges is adjacent to the bushing and an opposite end of the another at least two cartridges is adjacent to the rod end housing.

In addition to one or more of the features described above or below, or as an alternative, further embodiments could include wherein the at least one or more cavities comprise a first cavity and a second cavity, the first cavity and the second cavity being in communication with one another via a passage way.

In addition to one or more of the features described above or below, or as an alternative, further embodiments could include wherein the first cavity, the second cavity, and the passage way comprise a fluid.

According to one or more embodiments, a rotary wing aircraft is provided. The rotary wing aircraft comprises a fuselage, a propulsion system attached to the fuselage, a plurality of blade assemblies and a rotor hub driven by the propulsion system to rotate the blade assemblies and having a damper assembly coupled to each of the plurality of blade assemblies. The damper assembly comprises a housing defining at least one or more cavities and a piston in operable communication with the housing. The damper assembly comprises a rod end operatively coupled to the piston, the rod end comprising at least two elastomeric core cartridges separated by a void.

In addition to one or more of the features described above or below, or as an alternative, further embodiments could include a main rotor system comprising the plurality of blade assemblies and the rotor hub.

In addition to one or more of the features described above or below, or as an alternative, further embodiments could include at least one engine and a gear box coupled with the at least one engine and the main rotor system.

In addition to one or more of the features described above or below, or as an alternative, further embodiments could include another rod end operatively coupled to the housing, the another rod end comprising another at least two cartridges.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses are presented herein by way of exemplification and not limitation with reference to the Figures.

State-of-the-art main rotor damper elastomeric rod end bearings have undesirable stiffness, typically known as cocking stiffness, about the damper axes. This stiffness causes spiral motion inside the damper and results in additional wearing of the damper internal barrel and piston components. However, exemplary embodiments are configured to replacing the circular steel-elastomeric rod end with two steel-elastomeric cartridges. According to exemplary embodiments, the design reduces the undesirable rod end cocking stiffness and damper torsional stiffness, thereby reducing the damper wear out and increasing its lifespan.

Figure 1:
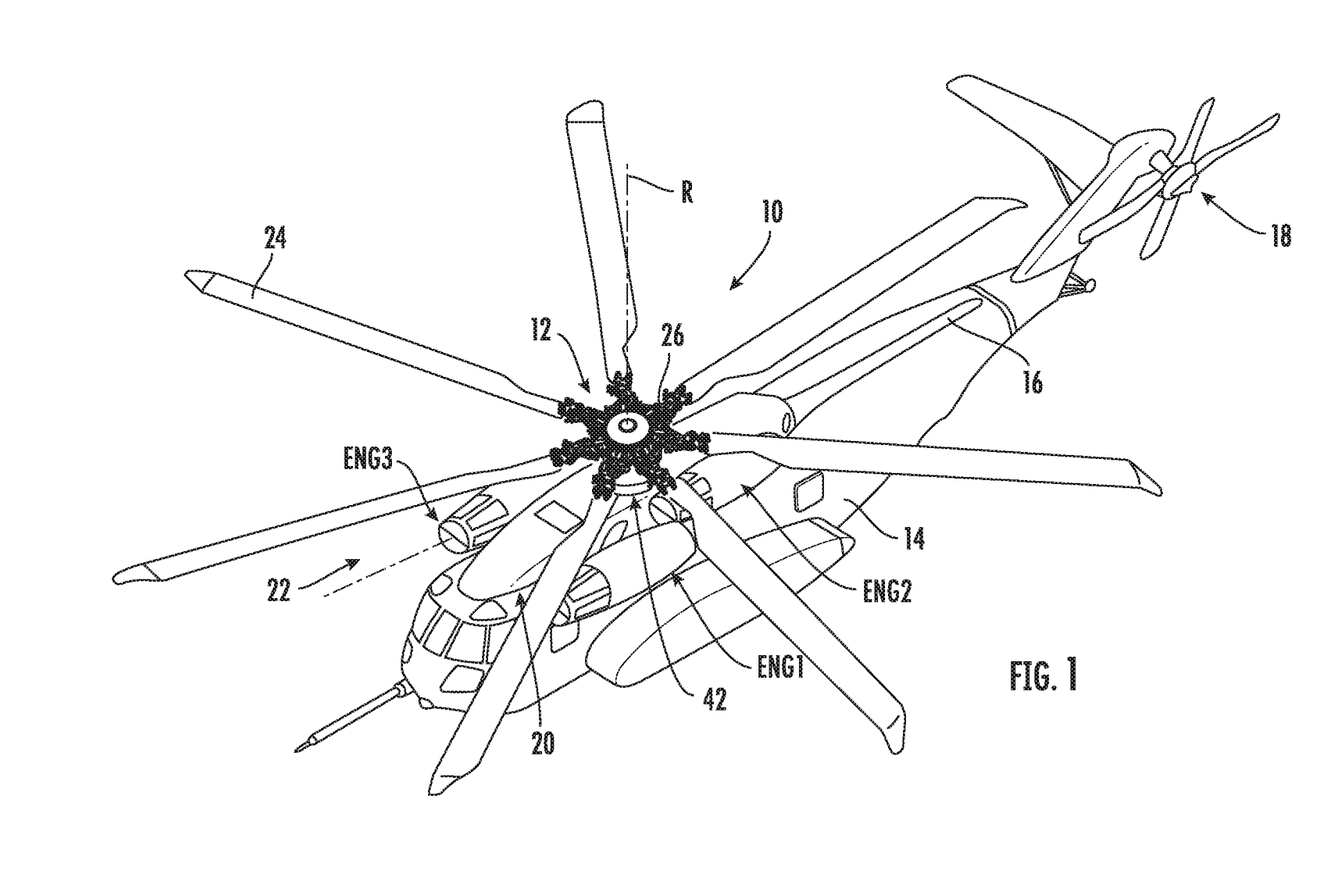
FIG. 1 depicts a rotary wing aircraft in accordance with an exemplary embodiment.

FIG. 1 schematically illustrates a rotary-wing aircraft 10 having a main rotor system 12. The aircraft 10 includes an airframe 14 (or fuselage) having an extending tail 16 which mounts an anti-torque system 18. The main rotor system 12 is driven about an axis of rotation R through a main gearbox (MGB) 20 by a multi-engine powerplant system 22, here having three engine packages ENG1, ENG2, ENG3. The multi-engine powerplant system 22 generates the power available for flight operations, and such power is coupled to the main rotor system 12 and the anti-torque system 18 through the MGB 20. While shown with a three engine package, it is understood that other numbers of engine packages could be used in other aspects of the invention.

Figure 2A:
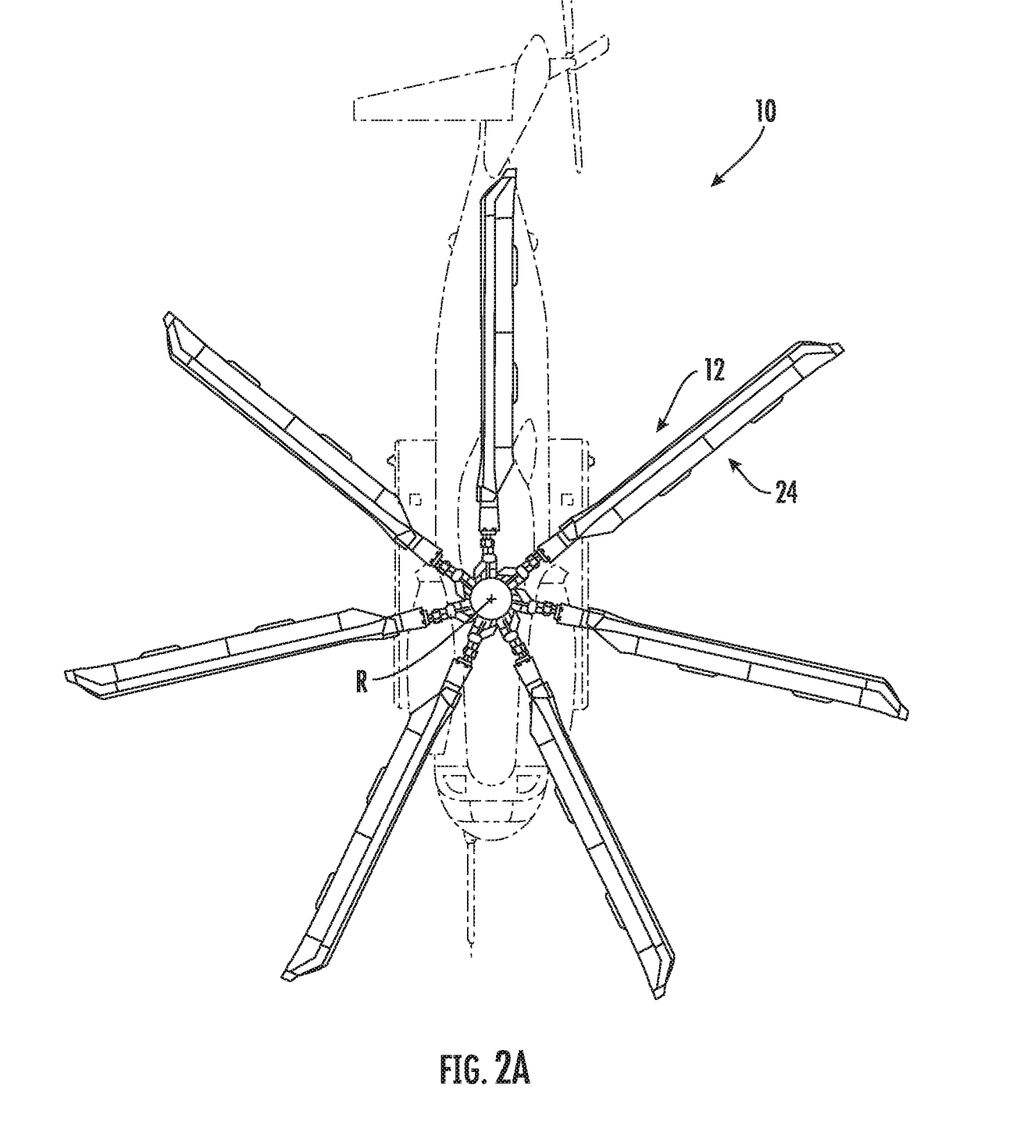
FIG. 2A depicts a top view of a main rotor system in accordance with an exemplary embodiment.

Referring to FIG. 2A, the main rotor system 12 includes seven rotor blade assemblies 24 each of which is mounted to the rotor hub 26 for rotation about an axis of rotation R. It should be understood that any number of rotor blade assemblies 24 may benefit here from. Furthermore, since each main rotor blade assembly 24 is generally alike, only one main rotor blade assembly 24 will be described in detail herein with the understanding that the description is generally applicable to each rotor blade assembly 24 and other displaceable members.

Figure 2B:
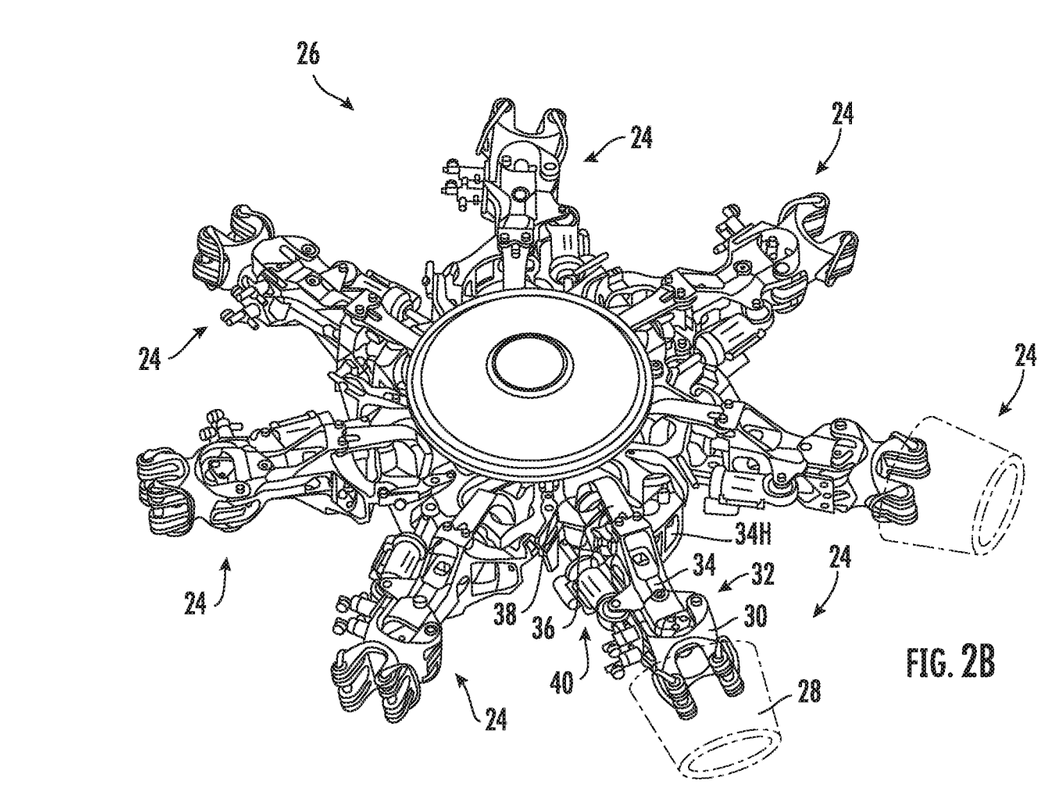
FIG. 2B depicts a top isometric view of a main rotor system in accordance with an exemplary embodiment.

Referring to FIG. 2B, each rotor blade assembly 24 generally includes a main rotor blade 28, a blade cuff 30, a hinge mechanism 32, a sleeve 34, a yoke 36, an elastomeric bearing 38 and a damper assembly 40. A pitch horn 34H extends from the sleeve 34 to receive pitch inputs from a swashplate 42 (depicted in FIG. 1).

The yoke 36 is mounted to the rotor hub 26 through the elastomeric bearing 38 such that the rotor blade assembly 24 may move in pitch, flap and lead/lag motions as generally understood. The damper assembly 40 reacts against the lead/lag motions of the blade assembly 24 and operates to dampen vibration.

Figure 3:
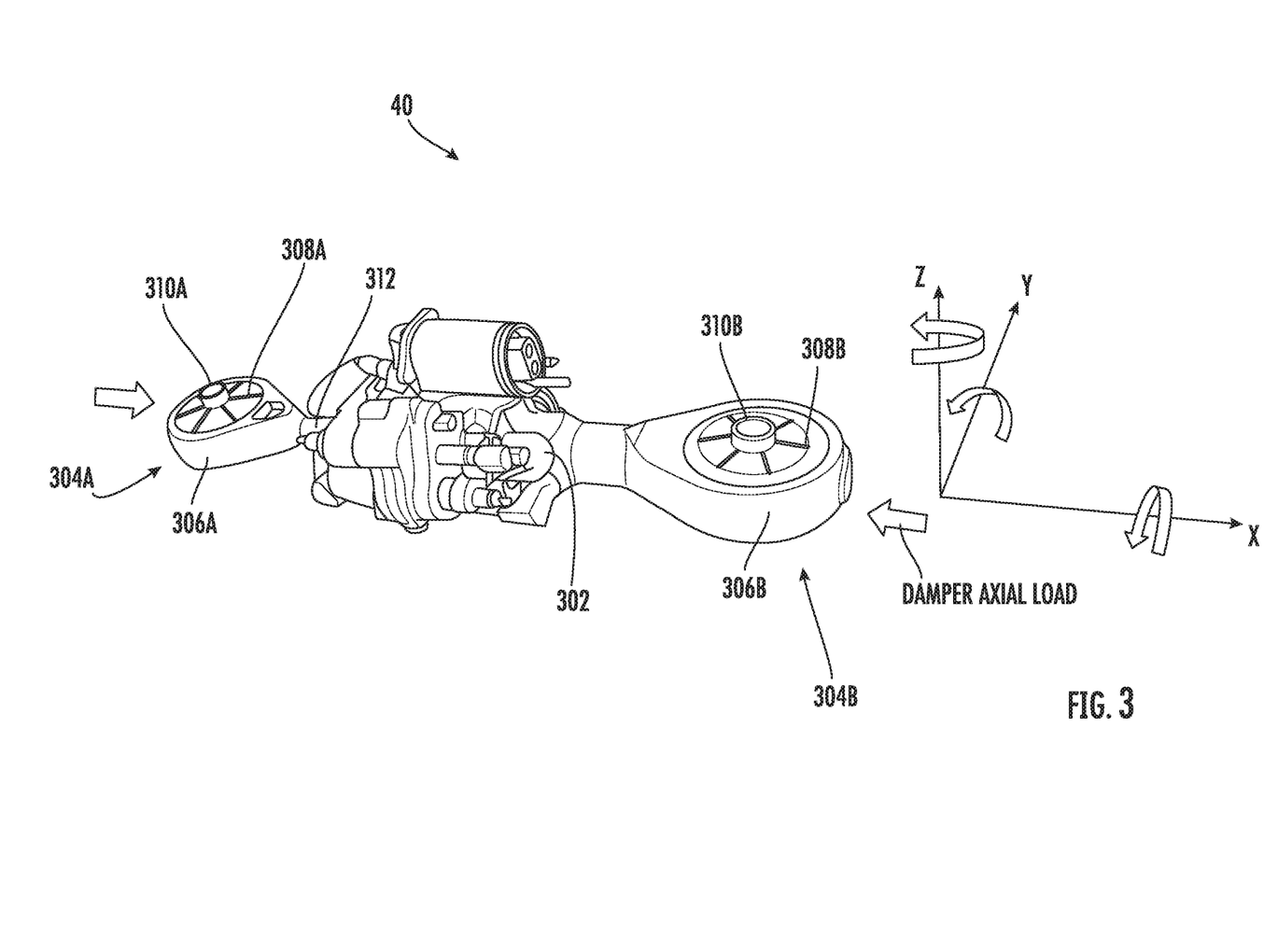
FIG. 3 depicts an example damper assembly in accordance with an exemplary embodiment.

FIG. 3 schematically illustrates an example damper assembly 40. The housing 302 comprises internal mechanisms for fluid flow in order to dampen vibration. Two rod end assemblies 304A and 304B or rod ends are operatively coupled to the housing 302. Damper rod end assembly 304A includes elastomeric rod end bearings 308A, while damper rod end assembly 304B includes elastomeric rod end bearings 308B. The elastomeric rod end bearings 308A and 308B each include an elastomeric core having elastomer layers intermeshed with steel shims, and the elastomeric rod end bearings 308A and 308B are pressed in their respective rod end housings 306A and 306B. In the elastomeric core center, there is a steel housing 310A and 310B (e.g., a steel bushing) to support the bolt (not shown), which connects the damper rod ends 304A and 304B to the main rotor blade assembly 24 and rotor hub 26, respectively. The damper rod end assembly 304A is connected to a piston or piston rod 312, which contracts and extends by moving in and out of the housing 302 according to the damper axial load.

Figure 4:
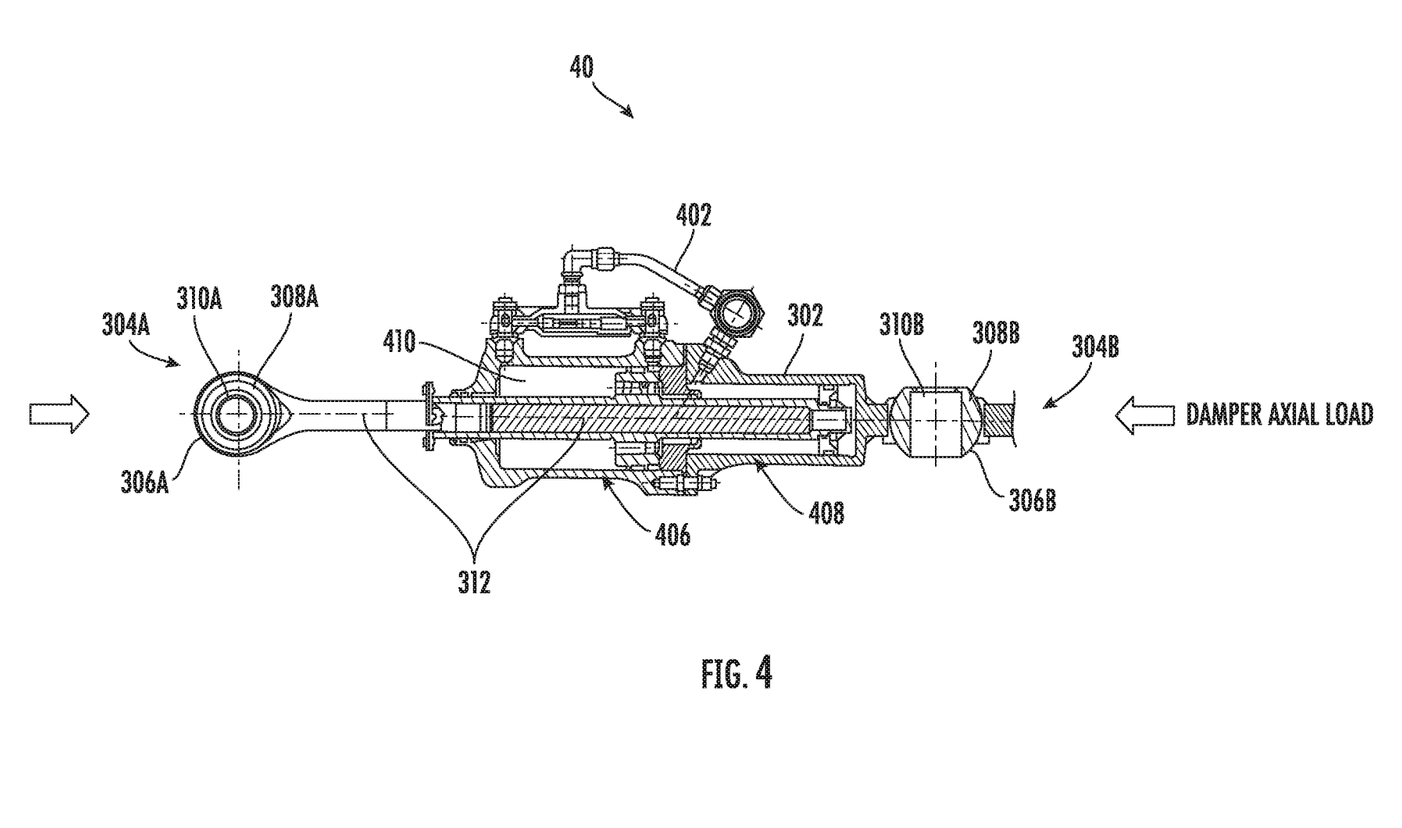
FIG. 4 depicts a cross-sectional view of an example damper assembly in accordance with an exemplary embodiment.
Figure 5:
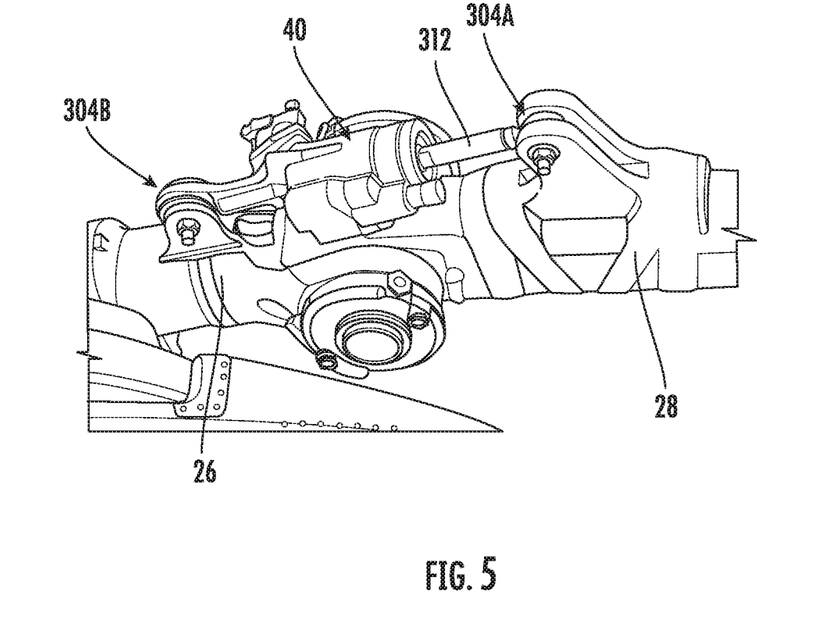
FIG. 5 depicts a main rotor damper assembly connected to a main rotor blade and main rotor hub in accordance with an exemplary embodiment.

FIG. 4 schematically illustrates a cross-sectional view of an example damper assembly 40 in which housing 302 defines cavities 406 and 408 having fluid 410. The cavities 406 and 408 can communicate via a passage way 402 according to the motion of the piston rod 312. As shown in FIG. 5, the main rotor damper assembly 40 operatively connects the moving main rotor blade 28 relative to the main rotor hub 26 through the two rod end bearings 308A and 308B (spherical bearings are depicted). During flight, the main rotor blade 28 moves relative to the main rotor hub 26 causing the damper assembly 40 to contract (or extend). Damper contraction causes the piston rod 312 to move pushing fluid 410 through orifices, such as passage way 402 (as depicted in FIG. 4), to thereby absorb energy. To isolate the damper from all blade motion relative to main rotor hub 26, except the contraction motion, the damper rod ends 304A and 304B have bearings 308A and 308B. In such an arrangement, the bearings 308A and 308B are intended to prevent any loads or moments to be reacted by the damper structure, except for the axial load causing the damper to contract. Earlier main rotor damper designs utilized steel spherical bearings, which performed properly but these steel spherical bearings were subject to premature wear out due to various environmental conditions, such as sand, etc. Accordingly, elastomeric rod end bearings 308A and 308B having an elastomeric core are used. Moving away from the steel spherical bearings to the elastomeric core brought about a tradeoff. The issue with the elastomeric rod end is the so called "cocking" stiffness where the angular stiffness about x, y, and z axes, as shown in FIG. 3, is not zero in the elastomeric core as it is for the steel spherical bearing. Even though the elastomeric rod end is designed to have minimal cocking stiffness, its value sometimes is excessive, causing damper bending and a spiral motion, while the damper is in a contracting and/or extending motion. This cocking stiffness causes premature wear out of the damper, thereby reducing its lifespan.

Figure 6:
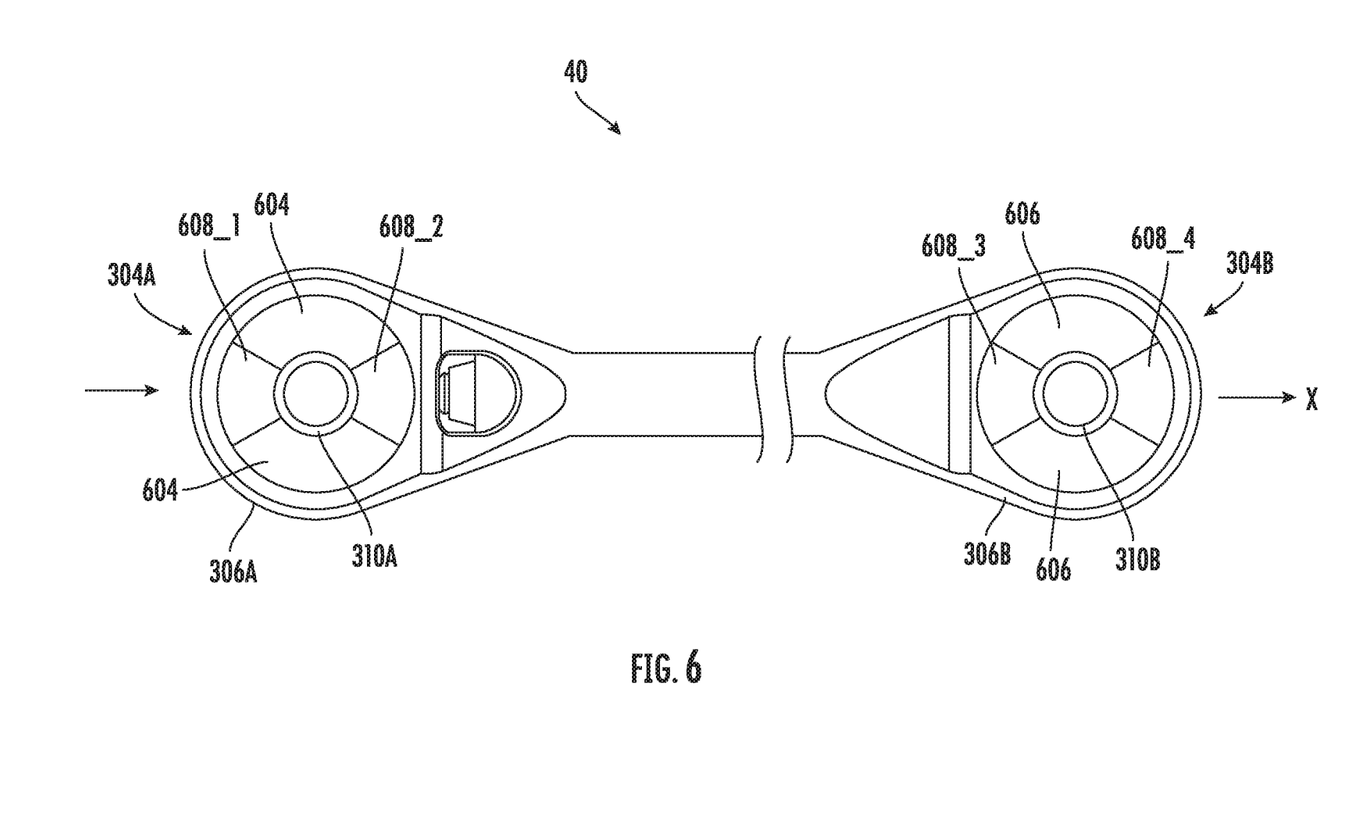
FIG. 6 depicts damper rod end assemblies each consisting of two elastomeric core cartridges in accordance with an exemplary embodiment.

To address this issue, FIG. 6 schematically illustrates the damper rod end assemblies 304A and 304B in the damper assembly 40 having an elastomeric rod end bearing each consisting of two elastomeric core cartridges, such as elastomeric core cartridges 608_1 and 608_2 and elastomeric core cartridges 608_3 and 608_4 respectively, instead of a single circular core. It should be appreciated that the bearings 308A and 308B are respectively illustrated as elastomeric core cartridges 608_1 and 608_2 and elastomeric core cartridges 608_3 and 608_4. The elastomeric core cartridges 608_1 and 608_2 and elastomeric core cartridges 608_3 and 608_4 are pressed in the respective rod end housings 306A and 306B to be positioned along (e.g., parallel) to the damper x-axis (i.e., along the axial load axis), while being symmetric to one another relative to the bearing bushing 310A, 310B. Symmetrical voids 604 are through the rod end housing 306A at locations where there is no elastomeric core cartridge, and symmetrical voids 606 are through the rod end housing 306B at locations where there is no elastomeric core cartridge. The elastomeric core cartridges 608_1 and 608_2 and elastomeric core cartridges 608_3 and 608_4 reduce, prevent, and/or remove the angular stiffness about x, y, and z axes.

Figure 7A:
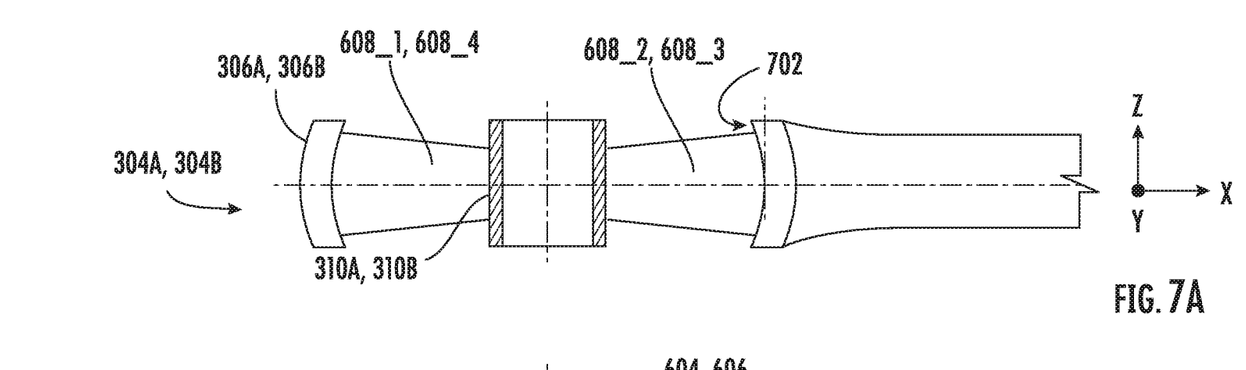
FIG. 7A depicts a cross-sectional view of a damper rod end assembly in accordance with an exemplary embodiment.
Figure 7B:
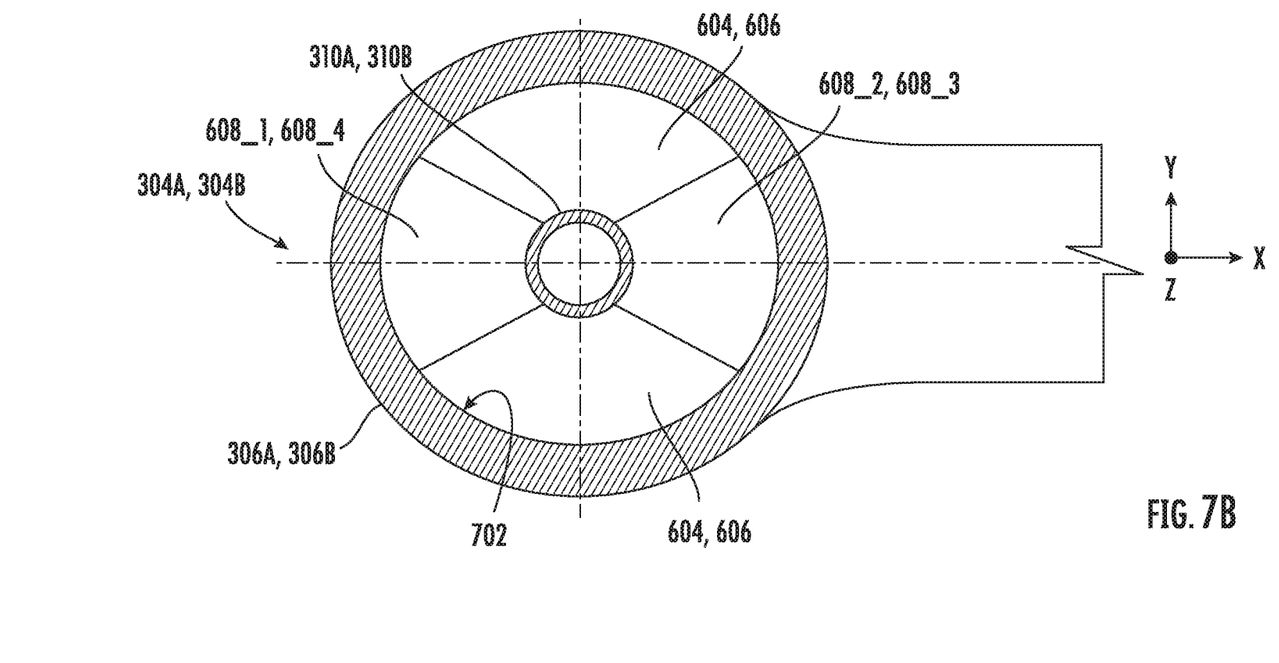
FIG. 7B depicts a top view of the damper rod end assembly in FIG. 7A in accordance with an exemplary embodiment.

FIG. 7A schematically illustrates a cross-sectional view of the damper rod end assembly, while FIG. 7B schematically illustrates a top view of the damper rod end assembly. Although a single damper rod assembly is shown, FIGS. 7A and 7B can be representative of damper rod assemblies 304A and 304B. The rod end housings 306A and 306B each have a circular shape and have an inner circular compartment 702. As seen in FIG. 7B, the inner circular compartment 702 is enclosed and is concentric with the respective bearing bushing 310A, 310B. The elastomeric core cartridges 608_1 and 608_2 each have a tapered end abutting the bearing bushing 310A and a wider end abutting the enclosed inner circular compartment 702. Similarly, elastomeric core cartridges 608_3 and 608_4 each have a tapered end abutting the bearing bushing 310B and a wider end abutting the enclosed inner circular compartment 702. Accordingly, the elastomeric core cartridges have a tapered or triangular shape in the x-y plane as depicted in FIG. 7B. The centerlines of the elastomeric core cartridges 608_1 and 608_2 and elastomeric core cartridges 608_3 and 608_4 are (directly) aligned with the damper axial load (i.e., axis of linear movement for the piston), such that the damper axial load is on the longitudinal axis of triangular shaped elastomeric core cartridges. In some embodiments, elastomeric core cartridges 608_1 and 608_2 and elastomeric core cartridges 608_3 and 608_4 can have a tapered thickness in the y-z plane depicted in FIG. 7A. In some embodiments, elastomeric core cartridges 608_1 and 608_2 and elastomeric core cartridges 608_3 and 608_4 can have a substantially uniform thickness in the y-z plane.

Symmetrical voids 604 separate the elastomeric core cartridges 608_1 and 608_2, while symmetrical voids 606 separate elastomeric core cartridges 608_3 and 608_4. The elastomeric core cartridges 608_1 and 608_2 and elastomeric core cartridges 608_3 and 608_4 comprise elastomeric layers intermeshed with steel shims, molded into the shape shown in the FIGS. 7A and 7B. The elastomeric core cartridges 608_1 and 608_2 and elastomeric core cartridges 608_3 and 608_4 are pressed inside of the respective rod end housing 306A, 306B, with the steel bushing at the middle.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. By way of example, aspects of the invention can be used in other forms of aircraft, including coaxial aircraft, tilt rotor aircraft and fixed wing aircraft. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A damper assembly comprising:
   a housing defining at least one or more cavities;
   a piston in operable communication with the housing; and
   a rod end operatively coupled to the piston, the rod end comprising at least two elastomeric core cartridges separated by a void;
   wherein the at least two elastomeric core cartridges are pressed within the rod end such that the at least two elastomeric core cartridges are symmetrically arranged within the rod end, and wherein a first end of each of the at least two elastomeric core cartridges is tapered and abuts a central bushing and a second end of each of the at least two elastomeric core cartridges is wider than the first end and abuts an inner surface of the rod end, the at least two elastomeric core cartridges being positioned to cause at least one of reduction, prevention, or removal of an angular stiffness about an axis of the rod end.

2. The damper assembly of claim 1, wherein the rod end comprises a rod end housing, the at least two elastomeric core cartridges opposing one another in the rod end housing.

3. The damper assembly of claim 1, further comprising another rod end operatively coupled to the housing, the another rod end comprising another at least two elastomeric core cartridges.

4. The damper assembly of claim 3, wherein each of the at least two cartridges and the another at least two elastomeric core cartridges comprises elastomeric material.

5. The damper assembly of claim 3, wherein the first end of each of the at least two elastomeric core cartridges and a first end of each of the another at least two elastomeric core cartridges is tapered in a first plane, while maintaining a substantially uniform thickness in a second plane.

6. The damper assembly of claim 5, wherein the first plane is substantially parallel to an axis of linear movement for the piston.

7. The damper assembly of claim 1, wherein the bushing separates the at least two elastomeric core cartridges within a rod end housing, such that the first end of the at least two elastomeric core cartridges is adjacent to the bushing and the second end of the at least two elastomeric core cartridges is adjacent to the rod end housing.

8. The damper assembly of claim 1, further comprising another rod end operatively coupled to the housing, the another rod end comprising another at least two elastomeric core cartridges, wherein a second bushing separates the another at least two elastomeric core cartridges within a rod end housing, such that a tapered end of the another at least two elastomeric core cartridges is adjacent to the second bushing and an opposite end of the another at least two elastomeric core cartridges is adjacent to the rod end housing.

9. The damper assembly of claim 1, wherein the at least one or more cavities comprise a first cavity and a second cavity, the first cavity and the second cavity being in communication with one another via a passage way.

10. The damper assembly of claim 9, wherein the first cavity, the second cavity, and the passage way comprise a fluid.

11. A rotary wing aircraft comprising:
a fuselage;
a propulsion system attached to the fuselage;
a plurality of blade assemblies; and
a rotor hub driven by the propulsion system to rotate the blade assemblies and having a damper assembly coupled to each of the plurality of blade assemblies, wherein the damper assembly comprises:
    a housing defining at least one or more cavities;
    a piston in operable communication with the housing; and
    a rod end operatively coupled to the piston, the rod end comprising at least two elastomeric core cartridges separated by a void;
    wherein the at least two elastomeric core cartridges are pressed within the rod end such that the at least two elastomeric core cartridges are symmetrically arranged within the rod end, and wherein a first end of each of the at least two elastomeric core cartridges is tapered and abuts a central bushing and a second end of each of the at least two elastomeric core cartridges is wider than the first end and abuts an inner surface of the rod end, the at least two elastomeric core cartridges being positioned to cause at least one of reduction, prevention, or removal of an angular stiffness about an axis of the rod end.

12. The rotary wing aircraft of claim 11, further comprising a main rotor system comprising the plurality of blade assemblies and the rotor hub.

13. The rotary wing aircraft of claim 12, further comprising at least one engine; and
a gear box coupled with the at least one engine and the main rotor system.

14. The rotary wing aircraft of claim 11, wherein the rod end comprises a rod end housing, the at least two elastomeric core cartridges opposing one another in the rod end housing.

15. The rotary wing aircraft of claim 11, further comprising another rod end operatively coupled to the housing, the another rod end comprising another at least two elastomeric core cartridges, wherein the another rod end comprises a rod end housing, the another at least two elastomeric core cartridges opposing one another in the rod end housing.

16. The rotary wing aircraft of claim 15, wherein each of the at least two elastomeric core cartridges and the another at least two elastomeric core cartridges comprises elastomeric material.

17. The rotary wing aircraft of claim 15, wherein the first end of each of the at least two elastomeric core cartridges and a first end of each of the another at least two elastomeric core cartridges is tapered in a first plane, while maintaining a substantially uniform thickness in a second plane.

18. The rotary wing aircraft of claim 17, wherein the first plane is substantially parallel to an axis of linear movement for the piston.

19. The rotary wing aircraft of claim 11, wherein the bushing separates the at least two elastomeric core cartridges within a rod end housing, such that the first end of the at least two cartridges is adjacent to the bushing and the second end of the at least two cartridges is adjacent to the rod end housing.

20. The rotary wing aircraft of claim 11, further comprising another rod end operatively coupled to the housing, the another rod end comprising another at least two elastomeric core cartridges, wherein a second bushing separates the another at least two elastomeric core cartridges within a rod end housing, such that a tapered end of the another at least two elastomeric core cartridges is adjacent to the second bushing and an opposite end of the another at least two elastomeric core cartridges is adjacent to the rod end housing.

\* \* \* \* \*